United States Patent
Kowalchuk

(10) Patent No.: US 10,645,864 B2
(45) Date of Patent: May 12, 2020

(54) PRODUCT RUNOUT TRACKING SYSTEM AND METHOD

(71) Applicant: CNH Industrial Canada, Ltd, Saskatoon (CA)

(72) Inventor: Trevor Lawrence Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 16/106,581

(22) Filed: Aug. 21, 2018

(65) Prior Publication Data

US 2020/0060071 A1 Feb. 27, 2020

(51) Int. Cl.
*G01F 1/704* (2006.01)
*A01C 7/10* (2006.01)
(Continued)

(52) U.S. Cl.
CPC .............. *A01C 7/105* (2013.01); *A01C 7/081* (2013.01); *G01F 1/007* (2013.01); *G01F 1/704* (2013.01); *G06Q 50/02* (2013.01)

(58) Field of Classification Search
CPC ......... A01C 7/105; A01C 7/081; A01C 7/102; A01C 15/00; A01C 15/04; G01F 1/007;
(Continued)

(56) References Cited

U.S. PATENT DOCUMENTS 5,684,476 A 11/1997 Anderson
5,721,679 A 2/1998 Monson
(Continued)

FOREIGN PATENT DOCUMENTS

JP 2005176741 7/2005
WO 2006105663 10/2006

OTHER PUBLICATIONS

Gehue "GPS Integrated Systems for Precision Farming". PhD Thesis University of Calgary, published Dec. 1994. [retrieved on Jun. 24, 2013] Retrieved from the Internet: <URL http://citeseerx.ist.psu.edu/viewdoc/download?doi=10.1.1.33.5386&rep=rep1&type=pdf>.

*Primary Examiner* — Hai Phan
*Assistant Examiner* — Anthony D Afrifa-Kyei
(74) *Attorney, Agent, or Firm* — Rebecca L. Henkel; Rickard K. DeMille

(57) ABSTRACT

A product runout tracking system for an agricultural implement includes a controller having a memory and a processor, wherein the controller is configured to determine a distance remaining until a storage tank is empty of a product based at least in part on an amount of the product within the storage tank of the agricultural implement, a flow rate of the product from the agricultural implement, a ground speed of the agricultural implement, or any combination thereof. The controller is further configured to determine a product runout location of the product within the storage tank based at least in part on the determined distance remaining and a planned route of the agricultural implement, wherein the product runout location includes a location within the field in which the storage tank is estimated to be empty of the product, and output the product runout location to a user interface for display to an operator of the agricultural implement.

20 Claims, 5 Drawing Sheets

(51) Int. Cl.
*A01C 7/08* (2006.01)
*G01F 1/00* (2006.01)
*G06Q 50/02* (2012.01)

(58) Field of Classification Search
CPC ....... G01F 1/704; G06Q 50/02; A01B 79/005;
Y02A 40/12; Y10S 111/903; A01M
9/0053; A01M 9/0092; B05B 15/02;
B05B 15/0208; B05B 15/0225; B05B
15/0258; B05B 15/50; B05B 15/52; B05B
15/5223; B05B 15/555
See application file for complete search history.

(56) References Cited

U.S. PATENT DOCUMENTS

| | | | |
|---|---|---|---|
| 6,128,574 A | 10/2000 | Diekhans | |
| 6,216,071 B1 | 4/2001 | Motz | |
| 6,516,271 B2 | 2/2003 | Upadhyaya et al. | |
| 6,826,460 B2 | 11/2004 | Kittell et al. | |
| 7,756,624 B2 | 7/2010 | Diekhans et al. | |
| 8,344,897 B2 | 1/2013 | Peterson et al. | |
| 8,386,169 B2 | 2/2013 | Nguyen | |
| 8,447,331 B2 | 5/2013 | Busch | |
| 9,043,096 B2 | 5/2015 | Zielke et al. | |
| 9,338,938 B2 | 5/2016 | Cash et al. | |
| 2011/0213531 A1 | 9/2011 | Farley et al. | |
| 2011/0246061 A1 | 10/2011 | Hayashi | |
| 2012/0036914 A1 | 2/2012 | Landphair et al. | |
| 2012/0253760 A1 | 10/2012 | Zielke | |
| 2012/0323452 A1 | 12/2012 | Green et al. | |
| 2013/0038455 A1* | 2/2013 | Chowdhary | G01F 23/284 340/612 |
| 2013/0046457 A1 | 2/2013 | Pettersson | |
| 2013/0054080 A1 | 2/2013 | Jacobson | |
| 2014/0165891 A1* | 6/2014 | Garner | A01C 7/08 111/170 |
| 2016/0278277 A1* | 9/2016 | V lberg | A01C 21/005 |
| 2017/0370765 A1 | 12/2017 | Meier et al. | |

* cited by examiner

PRODUCT RUNOUT TRACKING SYSTEM AND METHOD

BACKGROUND

The disclosure relates generally to a product runout tracking system for an agricultural implement.

Generally, an air cart is used to meter and deliver agricultural product (e.g., seeds, fertilizer) to a seeding implement. The air cart generally includes a storage tank (e.g., a pressurized tank), an air source (e.g., a blower), and a metering system. The product may be gravity fed from the storage tank to the metering system, which distributes a target volume of product into an air flow generated by the air source. The air flow carries the product to the row units via conduits extending between the air cart and the seeding implement. The metering system may include meter rollers that regulate the flow of product based on meter roller geometry and rotation rate.

Through distribution of the product from the storage tank of the air cart to the seeding implement, the product stored in the storage tank will be depleted as the air cart and the implement move throughout the field. To continue the distribution operation, the storage tank of the air cart will need to be refilled with the product. It is now recognized that an indication of a location at which the storage tank will be empty may improve efficiency of the distribution operation.

BRIEF DESCRIPTION

In one embodiment, a product runout tracking system for an agricultural implement includes a controller having a memory and a processor, wherein the controller is configured to determine a distance remaining until a storage tank is empty of a product based at least in part on an amount of the product within the storage tank of the agricultural implement, a flow rate of the product from the agricultural implement, a ground speed of the agricultural implement, or any combination thereof. The controller is further configured to determine a product runout location of the product within the storage tank based at least in part on the determined distance remaining and a planned route of the agricultural implement, wherein the product runout location includes a location within the field in which the storage tank is estimated to be empty of the product, and output the product runout location to a user interface for display to an operator of the agricultural implement.

In another embodiment, a product runout tracking system includes a product sensor configured to measure an amount of a product within a storage tank of an air cart, a flow sensor configured to measure a flow rate of distribution of the product from the air cart within an agricultural field, a ground speed sensor configured to measure a ground speed at which the air cart is moving through the agricultural field, and an air cart positioning system configured to determine a location of the air cart within the agricultural field. The product runout tracking system further includes a controller configured to receive one or more signals from the product sensor, one or more signals from the flow sensor, one or more signals from the ground speed sensor, and one or more signals from the air cart positioning system, and to determine a runout location of the product within the storage tank based at least in part on the amount of the product within the storage tank, the flow rate of the product from the air cart, the location of the air cart within the agricultural field, or any combination thereof, wherein the runout location includes a location within the agricultural field in which the storage tank is estimated to be empty of the product. The product runout tracking system further includes a user interface configured to receive the runout location from the controller and to display a runout map including the runout location.

In a further embodiment, a method of tracking product runout for an air cart includes receiving, via a processor, a first signal indicative of an amount of product within a storage tank of the air cart from a product sensor, receiving, via the processor, a second signal indicative of a flow rate of the product from the air cart, receiving, via the processor, a third signal indicative of a ground speed of the air cart from a ground speed sensor, receiving, via the processor, a fourth signal indicative of a location of the air cart within a field from an air cart positioning system, determining, via the processor, a product runout location within the field of the product within the storage tank based at least in part on the first signal, the second signal, the third signal, the fourth signal, or any combination thereof, and displaying, via a user interface, the product runout location.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
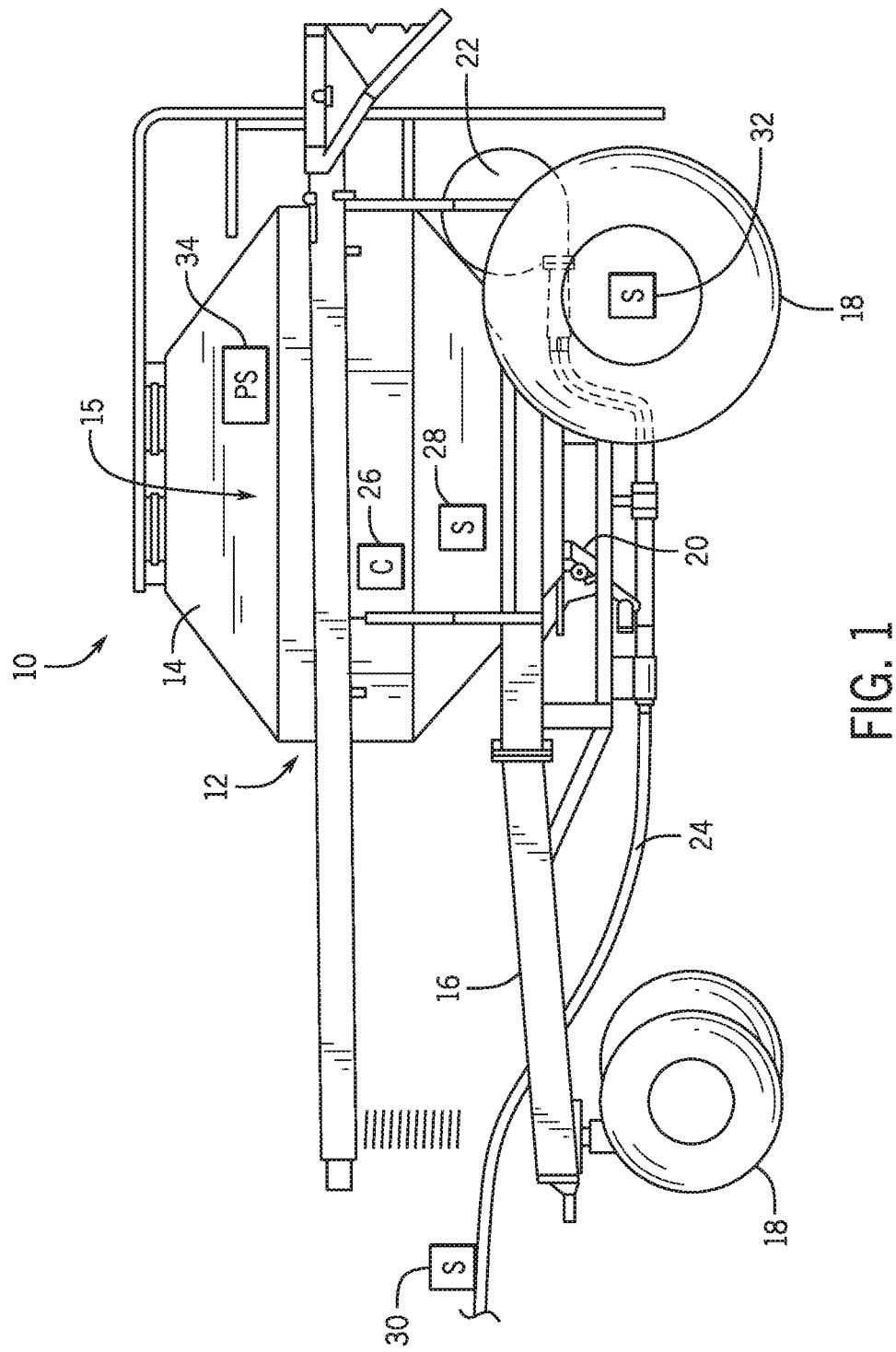
FIG. 1 is a side view of an embodiment of an air cart having a product runout tracking system, in accordance with an embodiment of the present disclosure.

Turning now to the drawings, FIG. 1 is a side view of an embodiment of an air cart 10 having a product runout tracking system 12. In some embodiments, the air cart 10 may be coupled to another agricultural implement, such as a seed placement tool, and the air cart 10 and the implement may be towed behind a work vehicle (e.g., tractor). The air cart 10 may be used in conjunction with the implement to distribute the product throughout a field. It should be understood that the present embodiments are discussed within the context of an air cart, however the product runout tracking system 12 is also applicable to any other type of implements that are used to store and/or apply a product to a field, such as a seeding implement, a planter, or a sprayer.

In the illustrated embodiment, the air cart 10 includes a storage tank 14, a frame 16, wheels 18, a metering system 20, and an air source 22. The storage tank 14 may contain a product 15 to be distributed throughout the field. The product 15 may be any type of solid or liquid agricultural product, such as seeds or fertilizer. In certain configurations, the storage tank 14 includes multiple compartments for storing various products 15 (e.g., flowable product materials). For example, one compartment may include seeds, such as canola or mustard, and another compartment may include a dry or liquid fertilizer. In such configurations, the air cart 10 is configured to deliver both the seeds and fertilizer to the implement. The frame 16 includes a towing hitch configured to couple to the implement or work vehicle. The product 15 within the storage tank 14 may be gravity fed into the metering system 20. The metering system 20 may include one or more meter rollers that regulate the flow of the product 15 from the storage tank 14 into an air flow provided by the air source 22. The air flow then carries the material to the implement via one or more pneumatic conduits 24. In this manner, the row units of the other implement may receive the product 15 for distribution into the field and/or deposition within the soil.

The product runout tracking system 12 may be used to determine a location (e.g., product runout location) within the field at which the air cart 10 may be empty (e.g., the air cart 10 may be considered empty when the air cart 10 runs out of the product 15 within the storage tank 14 or reaches a low product level at which the storage tank 14 should be filled). This runout location determination may be used to determine when the air cart should stop at a fill truck to refill the storage tank 14 with the product 15. The product runout tracking system 12 includes a controller 26 (e.g., electronic controller). The controller 26 may be disposed at various locations on the air cart 10. Additionally, the product runout tracking system 12 includes one or more sensors, which may be disposed at various locations about the air cart 10 and may be used to monitor various operational parameters related to product distribution from the air cart 10. The one or more sensors may communicate wirelessly with the controller 26 of the product runout tracking system 12; however, wired control circuitry may be included. Thus, the one or more sensors may send signals to the controller 26 indicative of the various operational parameters. For example, as shown in the illustrated embodiment, the product runout tracking system 12 includes a product sensor(s) 28 that monitors an amount of the product 15 within the storage tank 14. The product sensor 28 may be located below, adjacent to, or within the storage tank 14, or at any other location suitable for monitoring weight of the product 15 or otherwise monitoring an amount of the product 15 remaining in the storage tank 14. The product sensor 28 may be a scale sensor (e.g., weight sensor or load cell), a level sensor, a mechanical sensor, an ultrasonic sensor, an optical sensor, or any other type of sensor suitable to monitor weight of the product 15 or otherwise monitor an amount of the product 15 remaining in the storage tank 14 throughout the product distribution operation. The product sensor 28 may output a signal or signals to the controller 26 indicative the amount of product 15 remaining in the storage tank 14. In some embodiments, the product sensor 28 may be a laser scanner that may measure a volume of the product 15 in the storage tank 14, and the controller 36 may use the measured volume and a weight per liter, or per bushel, of the product 15 to determine the amount of product 15 remaining in the storage tank 14. The controller 36 may utilize the signal(s) received from the product sensor 28 as an input, in conjunction with signals from other sensors of the product runout tracking system 12, to determine the product runout location within the field.

In some embodiments, the product runout tracking system 12 includes a flow sensor(s) 30 that may be located along the pneumatic conduits 24 (e.g., one flow sensor per conduit) that carry the product 15 from the air cart 10 to the implement, or at any other location on the air cart 10 suitable for monitoring product flow characteristics from the storage tank 14 of the air cart 10. The flow sensor(s) 30 may determine product flow characteristics, such as a product flow rate and/or a product flow velocity. The flow sensor(s) 30 may output a signal or signals to the controller 26 indicative of the product flow characteristics of the product 15 from the storage tank 14. In some embodiments, product flow characteristics from the storage tank 14 of the air cart 10 may be determined based at least in part on calibration of the metering system 20. As discussed above, the metering system 20 may regulate the flow of the product 15 from the storage tank 14 into the air flow via the meter rollers, which may be set to rotate at a particular rotational speed to meter the product 15 at a particular flow rate by the controller 26 or another controller (e.g., air cart controller, work vehicle controller). As such, the controller 26 may determine the product flow characteristics based at least in part on the rotational speed of the meter rollers and calibration of the metering system 20 (e.g., an amount of the product 15 metered per minute, or other period of time, for a given rotational speed of the meter rollers).

Further, the product runout tracking system 12 may include a ground speed sensor(s) 32 that may be located adjacent to one or more of the wheels 18 of the air cart 10, or at any other location about the air cart 10 suitable for monitoring a ground speed of the air cart 10. In some embodiments, if the air cart 10 is being towed, the ground speed sensor 32 may be located on the implement or the work vehicle towing the air cart 10. The ground speed sensor 32 may determine the speed at which the air cart 10 is moving through the field. The ground speed sensor 32 may output a signal or signals to the controller 26 indicative of the ground speed of the air cart 10.

In some embodiments, the product runout tracking system 12 may receive and/or access a field map with a determined route (e.g., planned route, programmed route, recommended route) of the air cart 10 within the field. The field map may be generated by the controller 26 or other controller (e.g., air cart controller, work vehicle controller) based on inputs by an operator of the air cart 10 and/or other inputs regarding the field and/or the distribution operation. The field map may include field parameters, such as field size and boundaries, as well as the determined route, such as a number and location or rows, along which the air cart 10 will be driven or towed through the field during the distribution operation.

As shown, the product runout tracking system 12 includes an air cart positioning system 34 (e.g., global positioning system [GPS]) that may be located at any position on the air cart 10, or an agricultural system including the air cart 10, suitable for monitoring a location (e.g., an absolute or relative location) of the air cart 10 within the field and along the planned route provided via the field map. That is, in some embodiments, the air cart positioning system 34 may be located on the air cart 10; however, in some embodiments, the air cart positioning system 34 may be located on another implement or the work vehicle used to tow the air cart 10. The air cart positioning system 34 may communicate wirelessly with the controller 26; however, wired control circuitry may be included. The air cart positioning system 34 may determine a current location of the air cart 10 within the field and output a signal or signals to the controller 26 indicative of the current location of the air cart 10. The air cart positioning system 34 may determine the current location of the air cart 10 within the field and/or along the planned route provided by the field map, as well as, in some embodiments, a direction of travel of the air cart 10. In some embodiments, the air cart 10 may be an auto-steering implement and the air cart 10 may be guided along a predetermined route based on the field map.

As discussed in greater detail with reference to FIG. 3, the controller 36 may utilize the signal(s) received from the product sensor 28, the flow sensor 30, the ground speed sensor 32, the air cart positioning system 34, or any combination thereof, as inputs, along with the field map, to determine the product runout location within the field. The product runout location may be the location within the field that the controller 26 estimates that the air cart 10 will run out of the product 15. This product runout location may be based at least in part on the current amount of the product 15 within the storage tank 14, the rate at which the product 15 is being distributed from the air cart 10, the speed at which the air cart 10 is traveling through the field, the field map, the location of the air cart 10 within the field, the direction of travel of the air cart 10, or any combination thereof. As an example calculation of the product runout location, the product runout tracking system 12 may determine a time to runout based at least in part on the current amount of the product 15 within the storage tank and the rate at which the product 15 is being distributed from the air car 10 (e.g., the flow rate of the product 15). The product runout track system 12 may determine a distance until runout based at least in part on the time until runout and the current ground speed of the air cart 10. Then, the product runout tracking system 12 may determine the product runout location based at least in part on the distance until runout, the input field map (e.g., planned route), and the current location and direction of travel from the air cart positioning system 34. It should be appreciated that the flow rate of the product and the ground speed of the air cart 10 may be dependent on each other, or these parameters may be independent of one another. As such, the controller 26 may determine the product runout location, which may be used by the controller 26 or an operator to determine an efficient time to refill the storage tank 14 via a fill truck at a refill location (e.g., within or near the field).

Figure 2:
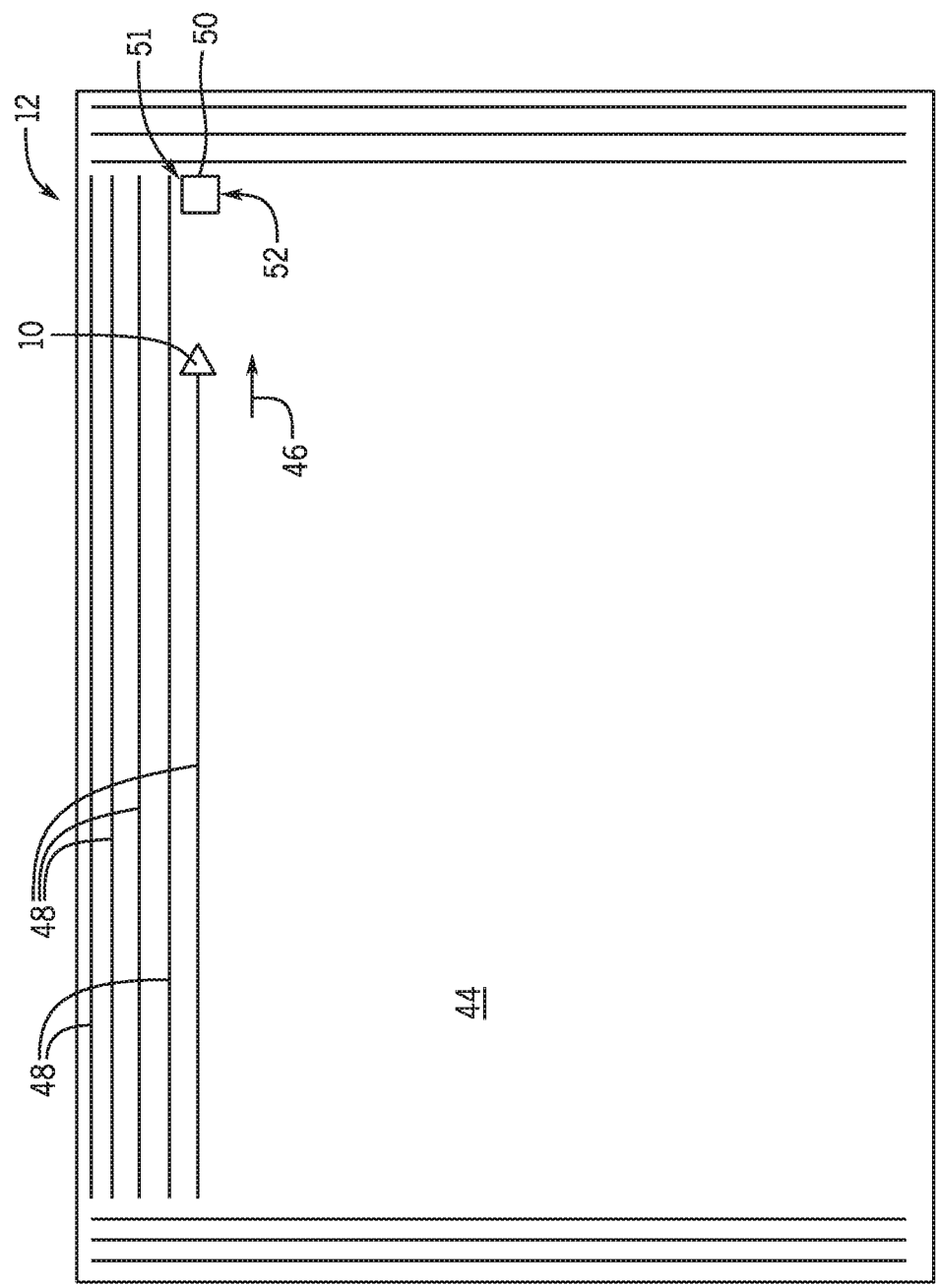
FIG. 2 is a schematic diagram of an embodiment of an agricultural field in which the air cart of FIG. 1 may be operated, in accordance with an embodiment of the present disclosure.

FIG. 2 a schematic diagram of an embodiment of an agricultural field 44 in which the air cart 10 may be operated. During a product distribution operation, the air cart 10 may travel throughout the field 44 in a direction of travel 46. Typically, the air cart 10 will travel back and forth in substantially parallel rows until the product 15 has been distributed throughout a target area of the field 44. In the illustrated embodiment, the rows 48 represent the rows along which the air cart 10 has distributed the product 15. As the air cart 10 travels back and forth along the rows 48 to distribute the product 15, the product 15 within the storage tank 14 of the air cart 10 will be depleted. When the storage tank 14 is sufficiently empty of the product 15, the storage tank 14 may be refilled with the product 15 via a fill truck 50 at a refill location 51. One or more fill trucks 50 may be utilized for refilling the air cart 10 within the field 44. The fill truck 50 may remain stationary at a predetermined refill location 51, or in some embodiments, the fill truck 50 may travel throughout or around the field. In embodiments where the fill truck 50 remains at the predetermined refill location 51 within the field 44, the fill truck 50 may be positioned adjacent to the ends of the rows 48 along which the air cart 10 is distributing the product 15, as shown in the illustrated embodiment, or at any other location in the field 44.

The product runout tracking system 12 of the air cart 10 may provide the product runout location in the field 44 at which the storage tank 14 of the air cart 10 will run out of the product 15 that is being distributed. The product runout location may provide for increased efficiency of the product distribution operation by allowing the controller 26 and/or an operator of the air cart 10 to determine whether the air cart 10 is carrying enough of the product 15 to complete one or more additional rows 48 before the product 15 is depleted or whether the air cart 10 should be refilled at the fill truck 50 before starting the next row 48. This may allow for the distribution operation to be paused less for refilling and/or may allow for product distribution to be achieved without interruption along the whole of each row 48 the air cart 10 travels through the field 44. As previously discussed, the product runout tracking system 12 may determine the product runout location based at least in part on the current amount of the product 15 within the storage tank 14, the rate at which the product 15 is being distributed from the air cart 10, and/or the speed at which the air cart 10 is traveling through the field 44. Further, the product runout tracking system 12 may access the field map and may include the air cart positioning system 34 which, in conjunction with the product amount, the distribution rate, the speed of travel of the air cart 10, or a combination thereof, may allow the controller 26 of the product runout tracking system 12 to determine the product runout location within the field 44.

Additionally, in some embodiments, the product runout tracking system 12 may include a fill truck positioning system 52 (e.g., GPS) that may be located at any position on the fill truck 50 suitable for monitoring a location of the fill truck 50 within the field 44. The fill truck positioning system 52 may determine a current location of the fill truck 50 within or relative to the field 44 and output a signal or signals to the controller 26 indicative of the current location of the fill truck 50. The fill truck positioning system 52 may communicate wirelessly with the controller 26 of the product runout tracking system 12. Additionally, in embodiments where the fill truck 50 does not remain stationary at a predetermined location relative to the field 44, the fill truck positioning system 52 may determine a direction of travel of the fill truck 50. The controller 26 of the product runout tracking system 12 may cause the determined product runout location, as well as the location of the fill truck 50, to be displayed to the operator, as discussed in greater detail with respect to FIGS. 3 and 4. Determination and/or display of the product runout location and the location of the fill truck 50 may allow the controller 26 and/or an operator of the air cart 10 to determine whether the air cart 10 is carrying enough of the product 15 to complete one or more additional rows 48 before the product 15 is depleted or whether the air cart 10 should be refilled at the fill truck 50 before starting the next row 48, thus increasing efficiency and productivity of the product distribution operation.

Figure 3:
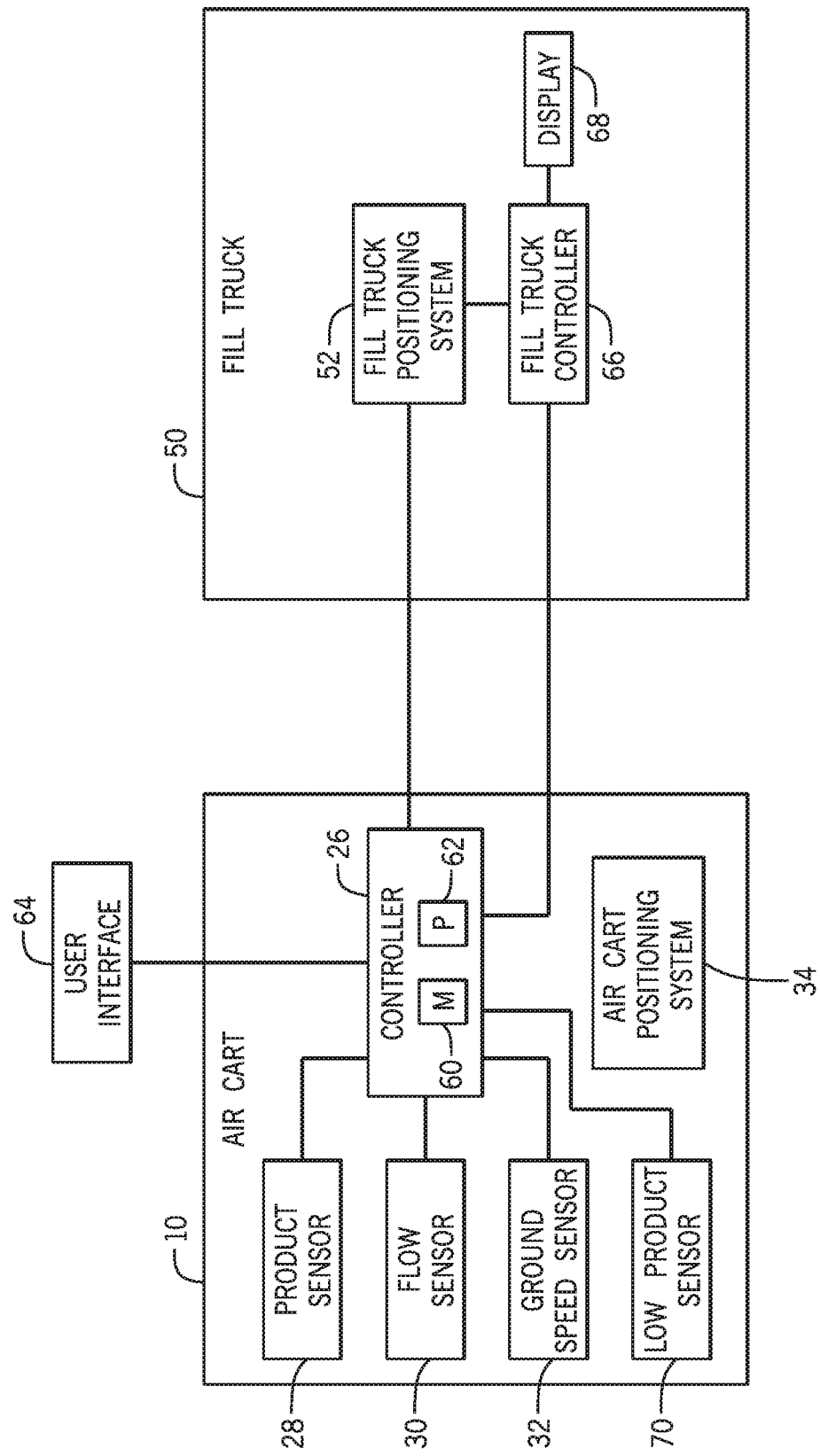
FIG. 3 is a schematic diagram of an embodiment of the product runout tracking system of FIG. 1, in accordance with the present disclosure.

FIG. 3 is a schematic diagram of an embodiment of the product runout tracking system 12 for tracking and determining the product runout location at which the storage tank 14 of the air cart 10 is predicted to be empty of the product 15. As previously discussed, the product runout tracking system 12 may include the controller 26, various sensors, including the product sensor 28, the flow sensor 30, the ground speed sensor 32, the air cart positioning system 34, and the fill truck positioning system 52, or any combination thereof. The controller 26 may include a memory 60 and a processor 62. In some embodiments, the memory 60 may include one or more tangible, non-transitory, computer-readable media that store instructions executable by the processor 62 and/or data (e.g., field maps) to be processed by the processor 62. For example, the memory 60 may include access memory (RAM), read only memory (ROM), rewritable non-volatile memory such as flash memory, hard drives, optical discs, and/or the like. Additionally, the processor 62 may include one or more general purpose microprocessors, one or more application specific processors (ASICs), one or more field programmable logic arrays (FPGAs), or any combination thereof.

The controller 26 may be communicatively coupled to the product sensor 28, the flow sensor 30, and the ground speed sensor 32. In operation, the controller 26 may receive signals indicative of operational parameters of the air cart 10 from the product sensor 28, the flow sensor 30, the ground speed sensor 32, or any combination thereof at the processor 62. In some embodiments, more or fewer sensors may be included in the product runout tracking system 12. The controller 26 may utilize the signal(s) received from the product sensor 28, the flow sensor 30, and the ground speed sensor 32 individually or in various combinations to determine an amount of time and/or distance until the air cart 10 may run out of or be depleted of the product 15 within the storage tank 14. Additionally, the controller 26 may access the field map and may be communicatively coupled to the air cart positioning system 34 to receive a signal or signals indicative of a current location and/or direction of travel of the air cart 10 within the agricultural field 44. The controller 26 may utilize the field map, as well as the signal(s) received from the air cart positioning system 34, in conjunction with the signal(s) received from the product sensor 28, the flow sensor 30, the ground speed sensor 32, or any combination thereof to determine the product runout location within the agricultural field 44 at which the air cart 10 may runout of the product 15. The controller 26 may then output an instruction signal to cause display of the runout location to the operator via a user interface 64.

The controller 26 may receive one or more signals indicative of an amount of the product 15 currently within the storage tank 14 of the air cart 10 via the product sensor 28. The controller 26 may receive one or more signals indicative of flow characteristics of the product 15 from the storage tank 14, such as a product flow rate and/or a product flow velocity via the flow sensor 30. Additionally, the controller 26 may receive one or more signals indicative of a speed at which the air cart 10 is traveling through the field 44 via the ground speed sensor 32. Based at least in part on the input signals received from the sensors, including the product sensor 28, the flow sensor 30, and/or the ground speed sensor 32, the controller 26 may determine a distance remaining until the air cart 10 is depleted of the product 15 within the storage tank 14. Additionally, based at least in part on the determined distance remaining until the air cart 10 is depleted of the product 15, the field map, and the input signals received from the air cart positioning system 34 indicative of the current location and/or direction of travel of the air cart 10, the controller 26 may determine the product runout location of the product 15 of the air cart 10 representative of the location within the agricultural field 44 that the air cart may be depleted of the product 15. The controller 26 may then output the determined product runout location to the user interface 64 for display to the operator. The user interface 64 may be located within the air cart 10, within a cabin of a work vehicle that may be towing the air cart 10, or at any other location suitable for display of the product runout location to the operator of the air cart 10. Determination and/or display of the product runout location of the product 15 within the storage tank 14 of the air cart may increase product utilization.

Additionally, in some embodiments, the controller 26 may be communicatively coupled to the fill truck positioning system 52 of the fill truck 50. The controller 26 may receive one or more signals indicative of a current location of the fill truck 50, and in some embodiments a direction of travel of the fill truck 50, via the fill truck positioning system 52. The controller 26 may receive the one or more signals indicative of the current location of the fill truck 50 via the fill truck positioning system 52 directly, or indirectly via a fill truck controller 66. The controller 26 may then output the current location of the fill truck 50 to the user interface 64 and cause the current location of the fill tuck 50 to be displayed to the operator based at least in part on the one or more signals received via the fill truck positioning system 52. Additionally or alternatively, in some embodiments, the controller 26 may output the determined product runout location of the air cart 10 to the fill truck 50, which may be received via the fill truck controller 66. This may indicate to the fill truck 50 and/or an operator of the fill truck 50, via a display 68 of the fill truck, to meet the air cart 10 at the determined product runout location, or at a location near the determined product runout location, such as the end of the row 48 along which the air cart 10 is determined to run out of the product 15, thus further increasing utilization of the product 15 within the storage tank 14 of the air cart 10.

In some embodiments, determination and/or display of the product runout location may be triggered when the product 15 reaches a particular level within the storage tank 14 of the air cart 10. For example, in some embodiments, the air cart 10 may include a low product sensor 70. The low product sensor 70 may be a scale sensor (e.g., weight sensor or load cell), a level sensor, a mechanical sensor, an ultrasonic sensor, or any other type of sensor suitable for measuring when the product 15 within the storage tank 14 of the air cart 10 reaches a particular level above empty. The low product sensor 70 may send one or more signals to the controller 26 indicative of whether the product 15 within the storage tank 14 has reached the particular level. Upon receiving (e.g., in response to receiving) the one or more signals from the low product sensor 70, the controller 26 may determine the product runout location and/or cause the determined product runout location to be displayed via the user interface 64. Thus, the low product sensor 70 in conjunction with the controller 26 may allow the product runout location of the product 15 to the determined and/or displayed in response to (e.g., only when) the product level within the storage tank 14 has reached or fallen below the particular level (e.g., a preset or predetermined threshold).

Additionally or alternatively, the controller 26 may determine whether the product level within the storage tank 14 has reached or fallen below the level based at least in part on the signal(s) received from the product sensor 28. The controller 26 may compare the signal(s) received via the product sensor 28 indicative of the product weight or level within the storage tank 14 to the particular level. The controller 26 may then determine the product runout location and/or cause the product runout location to be displayed via the user interface 64 when it is determined that the product level within the storage tank 14 is at or below the particular level. The particular level may be stored in the memory 60. Such triggering of the determination and/or display of the product runout location may decrease information presented on the user interface 64 at other times and allow the product runout location to be hidden until the product runout location is approaching. In some embodiments, the format of the display of the product runout location may change in response to the product level being at or below the particular level. For example, a size, color, location, or other characteristic of the display of the product runout location may change.

Figure 4:
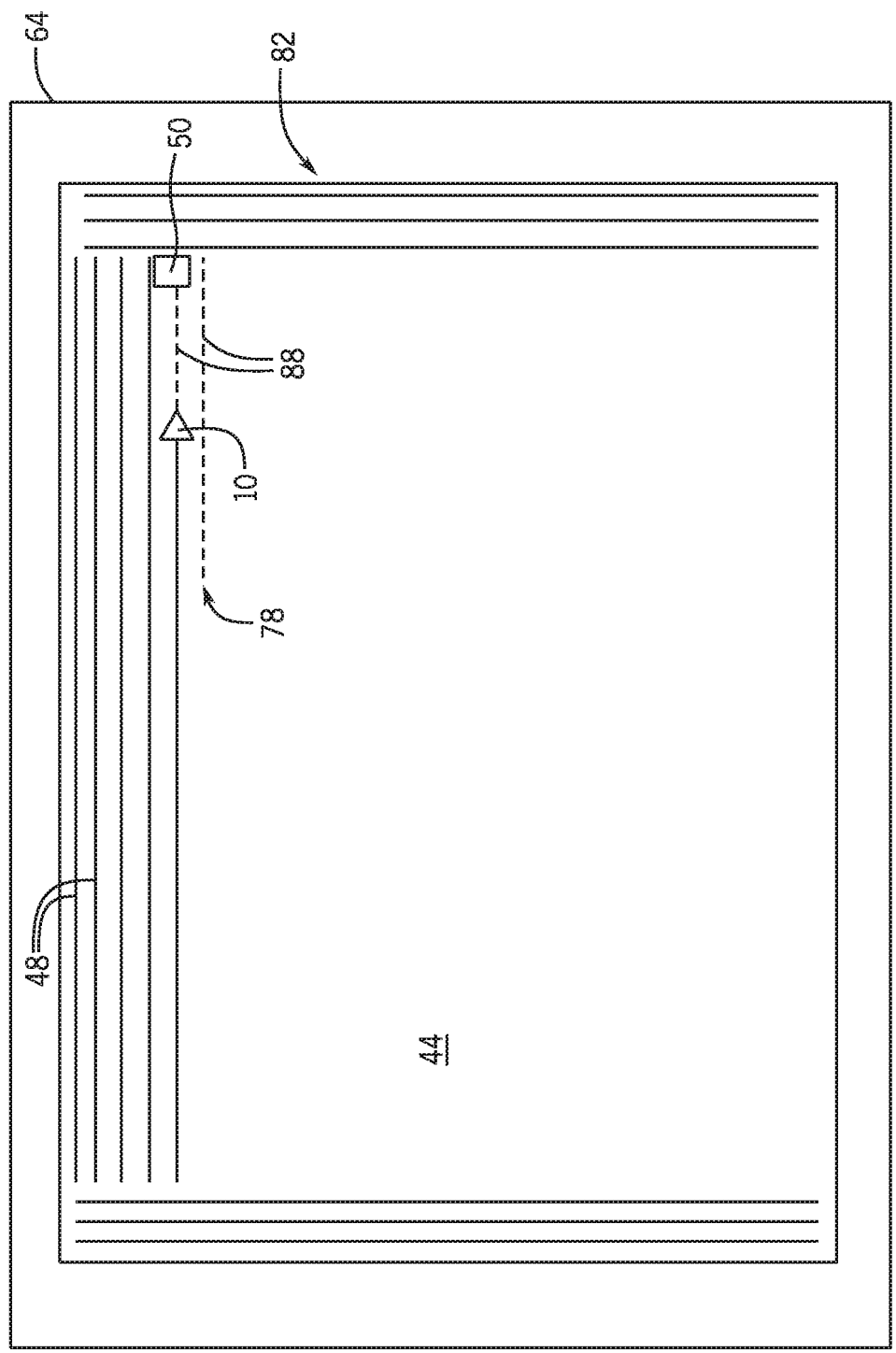
FIG. 4 is front view of an embodiment of a user interface that may be employed within the product runout tracking system of FIG. 1.

To illustrate the display of the product runout location determined by the controller 26, FIG. 4 is a front view of an embodiment the user interface 64. The user interface 64 may be located on the air cart 10 or at a remote location, such as within the cabin of the work vehicle if the air cart 10 is being towed by the work vehicle, or at any other location suitable for displaying the product runout location to the operator of the air cart 10. In some embodiments, the air cart 10 may be an auto-steering air cart in which the user interface 64 may be located remote from the air cart 10 and even remote from the field 44.

On the user interface 64, a product runout location 78 within a representation of the field 44 may be displayed visually to the operator of the air cart 10 via a runout map 82. As previously discussed, in some embodiments, display of the runout map 82 and/or the product runout location 78 on the runout map 82 via the user interface 64 may be triggered by the low product sensor 70 or via the controller 26 when it is determined that the product level within the storage tank 14 of the air cart 10 is at or below the particular level. The runout map 82 may include a visual representation of the air cart 10 within the field 44 and a representation of rows 48 along which the air cart 10 has distributed the product 15. The shape of the representation of the air cart 10, such as the triangular shape or arrow in the illustrated embodiment, may indicate the direction of travel of the air cart 10.

Further, the runout map 82 may show a representation of an amount or length of row(s) 88 along which the air cart 10 can still distribute the product 15 based at least in part on the product 15 remaining in the storage tank 14, the flow characteristics of the product 15 as it is distributed, and/or the ground speed of the air cart 10. The representation of the rows 48 and the row(s) 88 may be distinguished by different colors or patterns, such as dashed or solid lines, or in any other suitable visual technique that may distinguish the rows 48 representing where the air cart 10 has distributed the product 15 and the rows 88 representing the row(s) in which the air cart 10 may distribute product before the storage tank 14 is empty of the product 15. The row(s) 88 of the runout map 82 may end at the determined product runout location 78. The row(s) 48 and the row(s) 88 may be updated on the runout map 82 via the controller 26 as the air cart 10 moves through the field 44. The product runout location 78 may be represented as the end of the row(s) 88, as in the illustrated embodiment, and/or may be illustrated using a symbol, such as an "X", a color, or any other suitable marking. As such, the runout map 82 displayed via the user interface 64 may allow visual indication of the location within the field 44 that the air cart 10 may run out of the product 15, and thus allow increased efficiency and product utilization during the product distribution process.

Additionally, the runout map 82 may include a visual representation of the fill truck 50 illustrating the location of the fill truck 50 within the field 44. The fill truck 50 may be represented by a particular shape, such as a rectangle in the illustrated embodiment, a color, or any other suitable representation. As previously discussed, the controller 26 may determine the location of the fill truck 50 relative to the field 44 based at least in part on the signal(s) received from the fill truck positioning system 52. The controller 26 may update the display of the representation of the fill truck 50 in embodiments where the fill truck 50 moves throughout the field 44 and/or moves to the product runout location 78 or the end of a row when the product runout location 78 is determined and displayed. As such, the runout map 82 may allow visual representation of the location of the fill truck 50 within the field 44, thus further increasing efficiency and product utilization during the product distribution process. In some embodiments, the controller 26 may cause the user interface 64 to display a warning if it is determined that the air cart 10 may run out of product 15 before reaching the fill truck 50. The warning may be displayed on the runout map 82 or as an additional or alternative display on the user interface 64, such as a pop up display. Additionally, in some embodiments, the operator of the fill truck 50 may receive the runout map 82 and/or the product runout location 78 via the display 68 of the fill truck 50, thus allowing the fill truck 50 to meet the air cart 10 near or at the product runout location 78.

In some embodiments, the controller 26 may provide a recommendation (e.g., an audible alarm or textual message via the user interface 64) to the air cart 10 and/or the operator of the air cart 10 via the runout map 82 and/or accompanying the product runout location 78. For example, if the fill truck 50 is stationary, the recommendation may include a recommendation for the air cart 10 to travel to the fill truck 50 at the end of a row without beginning the next row. If the fill truck 50 moves throughout the field 44, the recommendation may include a recommendation to meet the fill truck 50 at a particular location within the field 44 at a particular time (e.g., drive along the path to the end of a row where the air cart 10 can stop and refill). This type of recommendation may additionally be provided to the operator of the fill truck 50 via the runout map 82 and/or accompanying the product runout location 78, such that the fill truck 50 may meet the air cart 10 at the particular location at the particular time. For example, the controller 26 may determine and provide a recommendation, via the display 64 and/or the display 68, to refill at the end of a row without beginning a next row. Additionally, the controller my update the runout map 82 after refill and as operational parameters change as the air cart 10 travels through the field 44.

While the product runout location 78 and other elements of the product runout tracking system 12, such as the air cart 84 and the fill truck 90, are illustrated as displayed on the runout map 82, the visual representation of the product runout location 78 and the other elements may be displayed using any other suitable visual representation.

Figure 5:
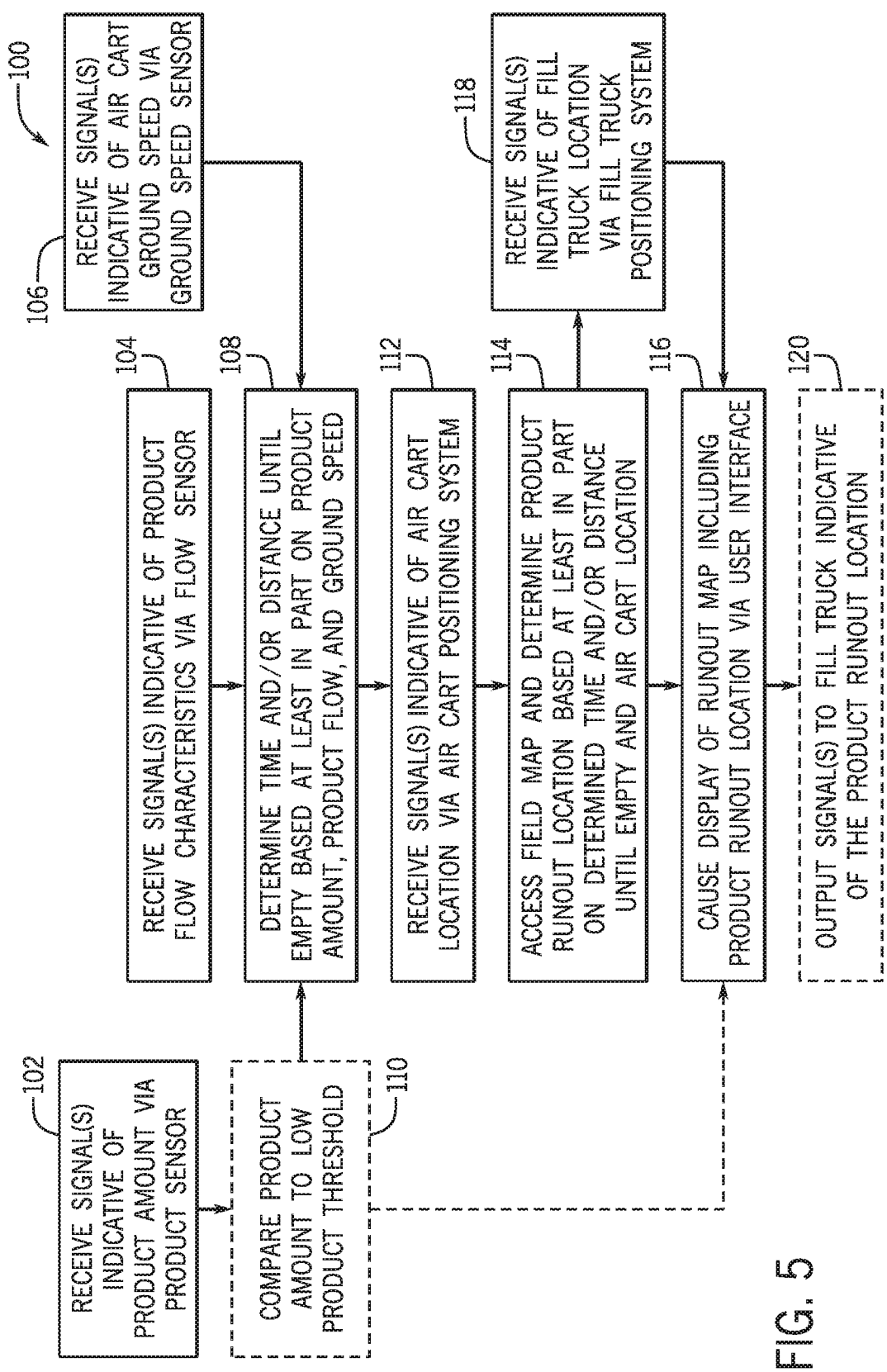
FIG. 5 is a flow diagram of an embodiment of a method for tracking and displaying product runout of the air cart using the product runout tracking system of FIG. 1.

FIG. 5 is a flow diagram of an embodiment of a method 100 for determining and displaying the product runout location 78 of the product 15 within the storage tank 14 of the air cart 10 using the product runout tracking system 12. At step 102, the controller 26 of the product runout tracking system 12 may receive one or more signals indicative of the amount (e.g., weight or level) of the product 15 remaining in the storage tank 14 of the air cart 10 via the product sensor 28. At step 104, the controller 26 may receive one or more signals indicative of product flow characteristics, such as the flow rate or velocity of the product 15, via the flow sensor 30. At step 106, the controller 26 may receive one or more signals indicative of the ground speed of the air cart 10 via the ground speed sensor 32. The signals at steps 102, 104, and 106 may be received in any order and may be received continuously throughout the distribution process. At step 108, the controller 26 may determine a distance remaining until the product 15 is emptied from the storage tank 14 of the air cart 10 based at least in part on the product amount the product flow characteristics, the ground speed of the air cart, or any combination thereof. In some embodiments, the determination at step 108 may be triggered in response to the controller 26 determining that the amount of the product 15 is at or below the particular level (e.g., predetermined low product threshold) at step 110. The determination at step 108 may be triggered by the low product sensor 70.

Next, at step 112, the controller 26 may receive one or more signals indicative of the current location and, in some embodiments, a direction of travel of the air cart 10 via the air cart positioning system 34. Next, at step 114, the controller 26 may access the field map and may determine the product runout location 78 within the field 44 of the product 15 based at least in part on the field map, the determined distance until the storage tank 14 is empty of the product 15, and the location and/or direction of travel of the air cart 10. As such, the controller 26 may determine the particular location within the field 44 at which the storage tank 14 of the air cart 10 may run out of the product 15. In some embodiments, the one or more signals received at step 112 may be received at the controller 26 at the same time as the signals received at steps 102, 104, and/or 106. As such the determinations at steps 108 and 114 may be combined such that the controller 26 may determine the product runout location 78 based at least in part on the product amount, the product flow characteristics, the ground speed of the air cart, the field map, the current location and/or direction of travel of the air cart 10, or any combination thereof.

Next, at step 116, the controller 26 may output the determined product runout location 78 and cause display of the runout map 82, including the product runout location 78 and the visual representation of the air cart 84, via the user interface 64 for display to the operator of the air cart 10. Additionally, the runout map 82 may include the visual representation 90 of the location of the fill truck 50. As such, at step 118, the controller 26 may receive one or more signals indicative of the location of the fill truck 50 via the fill truck positioning system 52. Therefore, at step 116, the controller 26 may additionally output and cause the user interface 64 to display the location of the fill truck 50 on the runout map 82. In some embodiments, such as if the fill truck 50 does not remain stationary in the field 44, at step 120, the controller 26 may output one or more signals to the fill truck 50 indicative of the product runout location 78, which may be received via the fill truck controller 66. The fill truck controller 66 or the controller 26 may cause the product runout location to be displayed via the display 68 of the fill truck 50 indicating to the fill truck 50 and/or the operator of the fill truck 50 to meet the air cart 10 at the product runout location, or at a location near the product runout location. The determination and display of the product runout location 78 in the field 44 at which the air cart 10 may run out of the product 15 within the storage tank 14 may allow visual indication of the location within the field 44 that the air cart 10 may run out of product 15, and thus may provide increased efficiency and product utilization during the product distribution process. As noted above, the controller 26 may output a recommendation at the air cart 10 and/or the fill truck 50.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A product runout tracking system for an agricultural implement, comprising a controller comprising a memory and a processor, wherein the controller is configured to:
   determine a distance remaining until a storage tank of the agricultural implement is predicted to reach an empty level at which the storage tank should be refilled based at least in part on an amount of a product within the storage tank of the agricultural implement, a flow rate of the product from the agricultural implement, and a ground speed of the agricultural implement;
   predict a product runout location of the product within the storage tank based at least in part on the determined distance remaining, a current location of the agricultural implement within a field, and a planned route of the agricultural implement through the field, wherein the product runout location comprises a location within the field and not yet reached by the agricultural implement and at which the storage tank is predicted to reach the empty level at which the storage tank should be refilled; and
   output the product runout location to a user interface for display to an operator of the agricultural implement.

2. The product runout tracking system of claim 1, wherein the controller is configured to output the product runout location to the user interface via outputting a signal indicative of an instruction to display, via the user interface, a runout map of the field comprising a visual representation of the predicted product runout location.

3. The product runout tracking system of claim 1, wherein the controller is configured to:
   compare the amount of the product within the storage tank to a low product threshold; and
   output, in response to a determination that the amount of the product is at or below the low product threshold, the product runout location to the user interface for display.

4. The product runout tracking system of claim 1, wherein the controller is configured to provide a recommendation to the user interface for display to the operator, wherein the recommendation advises the operator to refill the agricultural implement at an end of a current row.

5. The product runout tracking system of claim 1, wherein the controller is configured to:
   receive the amount of the product within the storage tank of the agricultural implement via a product sensor, as the agricultural implement dispenses the product from the storage tank to the field via a metering system as the agricultural implement travels through the field;
   receive the flow rate of the product from the agricultural implement via a flow sensor, as the agricultural implement dispenses the product from the storage tank to the field via the metering system as the agricultural implement travels through the field;
   receive the ground speed of the agricultural implement via a ground speed sensor, as the agricultural implement dispenses the product from the storage tank to the field via the metering system as the agricultural implement travels through the field; and
   receive or generate a field map comprising the planned route of the agricultural implement through the field;
   wherein the product runout location is within the field along the planned route, and the current location of the agricultural implement and the product runout location are separated by the determined distance remaining.

6. The product runout tracking system of claim 1, wherein the controller is configured to receive a refill location within the field, wherein the refill location comprises a respective current location of a fill truck used to refill the storage tank of the agricultural implement, and wherein the controller is configured to output the product runout location to the user interface via outputting a signal indicative of an instruction to display visual representations of the product runout location, the current location of the agricultural implement, and the refill location via the user interface.

7. The product runout tracking system of claim 6, wherein the controller is configured to output the product runout location to a display of the fill truck for display to an operator of the fill truck.

8. A product runout tracking system, comprising:
a product sensor configured to measure an amount of a product within a storage tank of an air cart;
a flow sensor configured to measure a flow rate of distribution of the product from the air cart within an agricultural field;
a ground speed sensor configured to measure a ground speed at which the air cart is moving through the agricultural field;
an air cart positioning system configured to determine a current location of the air cart within the agricultural field;
a controller configured to receive one or more signals from the product sensor, one or more signals from the flow sensor, one or more signals from the ground speed sensor, and one or more signals from the air cart positioning system, and to predict a runout location of the product within the storage tank based at least in part on the amount of the product within the storage tank, the flow rate of the product from the air cart, and the current location of the air cart within the agricultural field, wherein the runout location comprises a location not yet reached by the air cart within the agricultural field and at which the product in the storage tank is predicted to reach an empty level at which the storage tank should be refilled; and
a user interface configured to receive the runout location from the controller and to display a runout map comprising the runout location.

9. The product runout tracking system of claim 8, wherein the controller is configured to receive or to generate a planned route of the agricultural implement, and to use the planned route to predict the runout location.

10. The product runout tracking system of claim 8, comprising a fill truck positioning system configured to determine a refill location within or relative to the agricultural field, wherein the refill location comprises a respective current location of a fill truck used to refill the storage tank of the air cart, and wherein the controller is configured to receive the refill location from the fill truck positioning system, and wherein the runout map displayed via the user interface comprises the refill location.

11. The product runout tracking system of claim 10, wherein the controller is configured to output the runout location to a display of the fill truck.

12. The product runout tracking system of claim 8, wherein the controller is configured to compare the amount of the product within the storage tank to a predetermined low product threshold, and to instruct the user interface to display the runout map in response to a determination that the amount of the product is at or below the predetermined low product threshold.

13. The product runout tracking system of claim 8, comprising the air cart, wherein the product sensor and the flow sensor are disposed on the air cart, and wherein the user interface is disposed remote from the air cart.

14. The product runout tracking system of claim 8, wherein the controller is configured to output a recommendation in response to predicting the product runout location, and the recommendation advises an operator of the air cart to drive the air cart to a particular location in the field at a particular time to meet a fill truck, and wherein the user interface is configured to display the recommendation.

15. A method of tracking product runout for an air cart, comprising:
receiving, via a processor, a first signal indicative of an amount of product within a storage tank of the air cart from a product sensor;
receiving, via the processor, a second signal indicative of a flow rate of the product from the air cart;
receiving, via the processor, a third signal indicative of a ground speed of the air cart from a ground speed sensor;
receiving, via the processor, a fourth signal indicative of a current location of the air cart within a field from an air cart positioning system;
predicting, via the processor, a product runout location within the field of the product within the storage tank based at least in part on the first signal, the second signal, the third signal, and the fourth signal, wherein the product runout location comprises a location not yet reached by the air cart and at which the storage tank is predicted to reach a first predetermined threshold level at which the storage tank should be refilled; and
displaying, via a user interface, the product runout location.

16. The method of claim 15, wherein predicting the product runout location comprises:
determining, via the processor, a distance remaining until the storage tank is empty of the product based at least in part on the first signal, the second signal, the third signal, or a combination thereof; and
determining, via the processor, the product runout location based at least in part on the distance remaining until the storage tank is empty of the product, a planned route of the air cart, and the fourth signal.

17. The method of claim 15, wherein displaying the product runout location comprises displaying, via the user interface, a runout map comprising a visual representation of the product runout location, and a visual representation of the location of the air cart within the field.

18. The method of claim 17, comprising receiving, via the processor, a fifth signal indicative of a fill truck location within or relative to the field from a fill truck positioning system, and wherein displaying the product runout location comprises displaying, via the user interface, the runout map comprising a visual representation of the product runout location, a visual representation of the current location of the air cart within the field, and a visual representation of the fill truck location within the field.

19. The method of claim 15, comprising:
determining, using the processor, the amount of product within the storage tank based at least in part on the first signal; and
triggering, using the processor, the display of the product runout location via the user interface in response to the amount of product within the storage tank being below a second predetermined threshold level that is greater than the first predetermined threshold level.

20. The method of claim 15, comprising dispensing the product from the storage tank into a metering system of the air cart, and operating one or more meter rollers of the metering system to regulate the flow rate of the product from the air cart to an agricultural implement for deposition in the field as the air cart and the agricultural implement travel through the field.

* * * * *